United States Patent
Ono et al.

(10) Patent No.: US 10,460,876 B2
(45) Date of Patent: Oct. 29, 2019

(54) MULTI-LAYER CERAMIC CAPACITOR

(71) Applicant: Taiyo Yuden Co., Ltd., Tokyo (JP)

(72) Inventors: Ryo Ono, Tokyo (JP); Tetsuhiko Fukuoka, Tokyo (JP); Shoji Kusumoto, Tokyo (JP); Akihiko Kono, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/787,211

(22) Filed: Oct. 18, 2017

(65) Prior Publication Data

US 2018/0114645 A1    Apr. 26, 2018

(30) Foreign Application Priority Data

Oct. 26, 2016    (JP) .................................. 2016-209785

(51) Int. Cl.
| | | |
|---|---|---|
| H01G 4/30 | (2006.01) | |
| H01G 4/248 | (2006.01) | |
| H01G 4/12 | (2006.01) | |
| H01G 4/232 | (2006.01) | |

(52) U.S. Cl.
CPC ................ H01G 4/30 (2013.01); H01G 4/12 (2013.01); H01G 4/232 (2013.01); H01G 4/248 (2013.01)

(58) Field of Classification Search
CPC .................................. H01G 4/30; H01G 4/248
See application file for complete search history.

(56) References Cited

U.S. PATENT DOCUMENTS

| | | | | |
|---|---|---|---|---|
| 7,719,819 B2 * | 5/2010 | Motoki | ................ | H01G 4/0085 29/25.42 |
| 8,310,805 B2 * | 11/2012 | Tashima | ................ | H01G 4/012 361/303 |
| 8,717,738 B2 * | 5/2014 | Nishioka | ................ | H01G 4/30 361/301.4 |
| 9,336,945 B2 * | 5/2016 | Park | ....................... | H01G 4/012 |
| 9,666,374 B2 * | 5/2017 | Hattori | ................... | H01G 4/232 |
| 10,115,528 B2 * | 10/2018 | Abe | ....................... | H01G 4/005 |

(Continued)

FOREIGN PATENT DOCUMENTS

| | | | |
|---|---|---|---|
| JP | 2005235976 A | * | 9/2005 |
| JP | 2011151224 A | * | 8/2011 |
| JP | 2013-084871 A | | 5/2013 |

*Primary Examiner* — Nathan Milakovich
(74) *Attorney, Agent, or Firm* — Saliwanchik, Lloyd & Eisenschenk

(57) ABSTRACT

A multi-layer ceramic capacitor includes a body including a multi-layer unit and a side margin, and an external electrode. The multi-layer unit includes ceramic layers laminated in a first direction, first and second internal electrodes alternately disposed between the ceramic layers, an end surface oriented in a second direction orthogonal to the first direction, the first internal electrode being drawn from the end surface, an end margin disposed between the end surface and the second internal electrode, and a side surface oriented in a third direction orthogonal to the former directions, the internal electrodes being exposed to the side surface. The side margin covers the side surface. The external electrode includes an entry portion and covers the body from the side of the end surface, the entry portion being disposed on the end margin and entering a gap between the side surface and the side margin from the end surface.

6 Claims, 15 Drawing Sheets

(56) References Cited

U.S. PATENT DOCUMENTS

| | | | |
|---|---|---|---|
| 2013/0093556 A1 | 4/2013 | Lim | |
| 2014/0126110 A1* | 5/2014 | Kim | H01G 4/12 |
| | | | 361/321.2 |
| 2016/0240317 A1* | 8/2016 | Ro | H01G 4/30 |
| 2016/0351335 A1* | 12/2016 | Kato | H01G 4/30 |
| 2017/0287642 A1* | 10/2017 | Ono | H01G 4/30 |
| 2018/0182552 A1* | 6/2018 | Sawada | H01G 4/248 |

* cited by examiner

MULTI-LAYER CERAMIC CAPACITOR

CROSS REFERENCE TO RELATED APPLICATIONS

This application claims priority to Japanese Application No. 2016-209785, filed Oct. 26, 2016, the disclosure of which is incorporated herein by reference in its entirety.

BACKGROUND

The present invention relates to a multi-layer ceramic capacitor including side margins provided in a subsequent step.

A technique of increasing connection strength between an external electrode and a body is expected for a multi-layer ceramic capacitor. Such a technique prevents the external electrode from being peeled off from the body, and the reliability of the multi-layer ceramic capacitor can thus be increased.

For example, Japanese Patent Application Laid-open No. 2013-084871 (hereinafter, referred to as Patent Document 1) discloses a technique of increasing connection strength between a body and outer electrodes. In this technique, dummy electrodes, which are not connected to inner electrodes, are exposed in regions of a body where the outer electrodes are provided. In this technique, the dummy electrodes made of metal and the outer electrodes are favorably connected to each other, so that connection strength between the body and the outer electrodes is increased.

SUMMARY

Along with achievement of high performance of electronic devices, there has been a demand for increase in capacitance with respect to multi-layer ceramic capacitors mounted in the electronic devices. In order to increase the capacitance of the multi-layer ceramic capacitor, it is effective to enlarge an intersectional area of internal electrodes of the multi-layer ceramic capacitor.

In order to enlarge the intersectional area of the internal electrodes, there has recently been proposed a technique in which side margins for ensuring insulation properties of the periphery of the internal electrodes are provided to a multi-layer chip in a subsequent step, the internal electrodes being exposed to the side surfaces of the multi-layer chip. This technique makes it possible to form thin side margins and thus form a relatively large intersectional area of the internal electrodes.

Here, in the technique in which the side margins are provided to the side surfaces of the multi-layer chip in a subsequent step, in order to form the dummy electrodes as described in Patent Document 1, it is necessary to form dummy electrodes also in the side margins. However, forming dummy electrodes in the side margins needs advanced technical capabilities.

Therefore, in the multi-layer ceramic capacitor, a technique capable of increasing connection strength between a body and an external electrode is expected also for the configuration in which the side margins are provided in a subsequent step.

In view of the circumstances as described above, it is desirable to provide a multi-layer ceramic capacitor having high connection strength between an external electrode and a body.

According to an embodiment of the present invention, there is provided a multi-layer ceramic capacitor including a body and an external electrode.

The body includes a multi-layer unit and a side margin. The multi-layer unit includes ceramic layers laminated in a first direction, a first internal electrode and a second internal electrode that are alternately disposed between the ceramic layers, an end surface that is oriented in a second direction orthogonal to the first direction, the first internal electrode being drawn from the end surface, an end margin that is disposed between the end surface and the second internal electrode, and a side surface that is oriented in a third direction orthogonal to the first direction and the second direction, the first internal electrode and the second internal electrode being exposed to the side surface. The side margin covers the side surface of the multi-layer unit.

The external electrode includes an entry portion and covers the body from the side of the end surface, the entry portion being disposed on the end margin and entering a gap between the side surface and the side margin from the end surface.

In this configuration, the external electrode includes an entry portion that enters a gap between the side surface of the multi-layer unit and the side margin. With this configuration, the external electrode is connected to the first or second internal electrode not only in the end surface of the multi-layer unit but also in the end margin. In other words, in this configuration, a wide area where the external electrode and the first or second internal electrode are connected to each other can be ensured. With this configuration, high connection strength of the external electrode to the body can be obtained.

A dimension of the entry portion in the second direction may be 30% or less of a dimension of the end margin in the second direction.

With this configuration, in the multi-layer ceramic capacitor, it is possible to suppress defectives in terms of moisture resistance while increasing the connection strength between the external electrode and the body. Therefore, the reliability of the multi-layer ceramic capacitor is increased.

The entry portion may be provided over the entire width of the end margin in the first direction between the side margin and the side surface.

With this configuration, the connection strength between the body and the external electrode is more increased.

The entry portions may be provided separately from one another in the first direction between the side margin and the side surface.

With this configuration, the connection strength between the body and the external electrode is more increased.

It is possible to provide a multi-layer ceramic capacitor having high connection strength between an external electrode and a body.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, embodiments of the present invention will be described with reference to the drawings.

In the figures, an X axis, a Y axis, and a Z axis orthogonal to one another are shown as appropriate. The X axis, the Y axis, and the Z axis are common in all figures.

1. OVERALL CONFIGURATION OF MULTI-LAYER CERAMIC CAPACITOR 10

Figure 1:
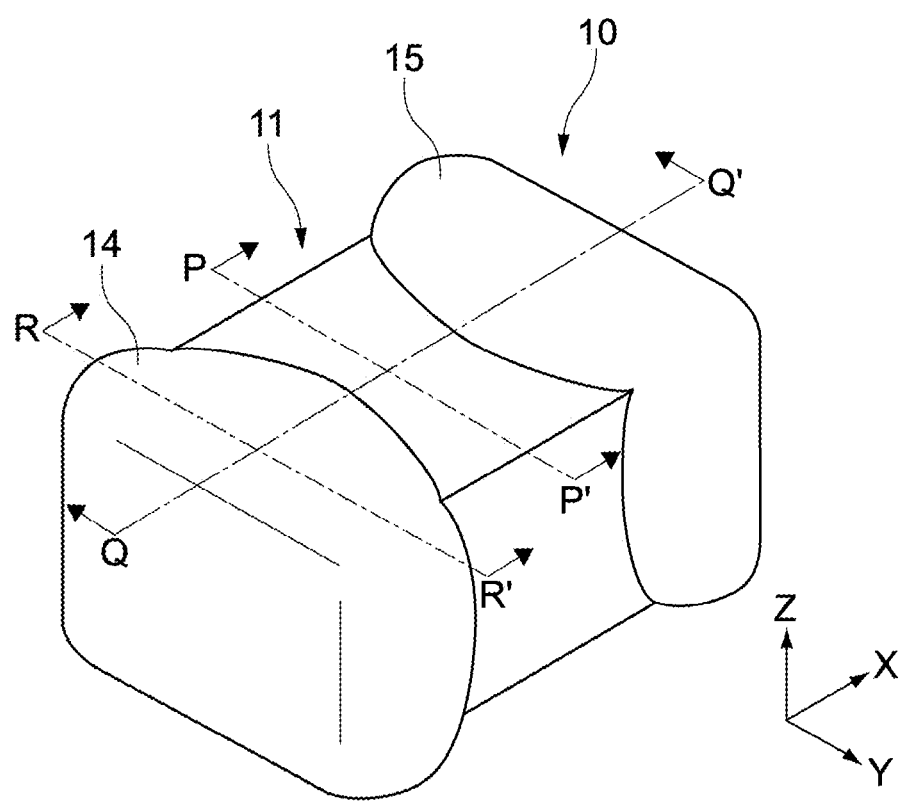
FIG. 1 is a perspective view of a multi-layer ceramic capacitor according to one embodiment of the present invention.
Figure 2:
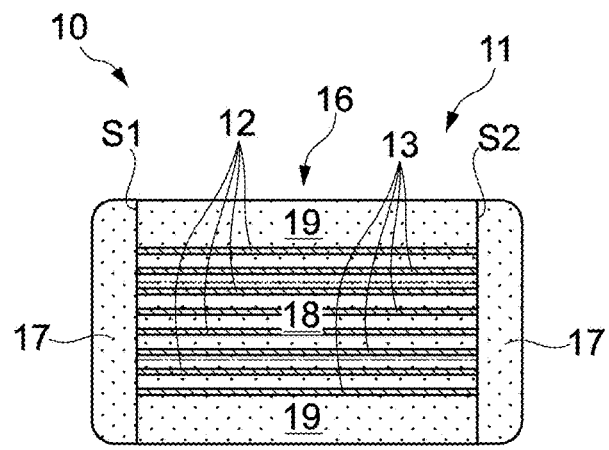
FIG. 2 is a cross-sectional view of the multi-layer ceramic capacitor taken along the P-P' line of FIG. 1.
Figure 3:
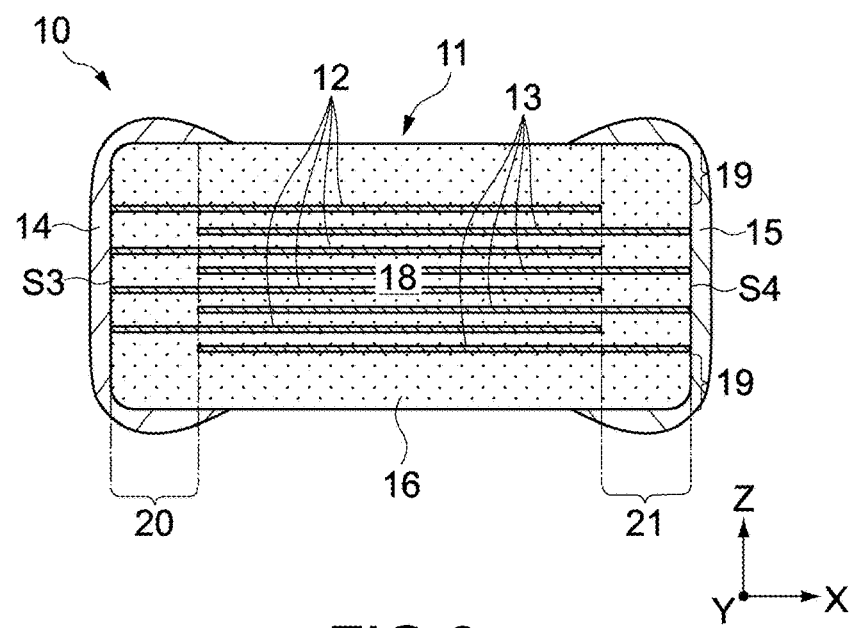
FIG. 3 is a cross-sectional view of the multi-layer ceramic capacitor taken along the Q-Q' line of FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the P-P' line of FIG. 1. FIG. 3 is a cross-sectional view of the multi-layer ceramic capacitor 10 taken along the Q-Q' line of FIG. 1.

The multi-layer ceramic capacitor 10 includes a body 11, a first external electrode 14, and a second external electrode 15.

Typically, the body 11 has two side surfaces oriented in a Y-axis direction and two main surfaces oriented in a Z-axis direction. Ridges connecting the respective surfaces of the body 11 are chamfered. It should be noted that the form of the body 11 is not limited to the form as described above. For example, the surfaces of the body 11 may be curved surfaces, and the body 11 may be rounded as a whole.

The first external electrode 14 and the second external electrode 15 cover both end surfaces of the body 11 that are oriented in an X-axis direction, and extend to four surfaces that are connected to both the end surfaces oriented in the X-axis direction. With this configuration, both of the first external electrode 14 and the second external electrode 15 have U-shaped cross sections in parallel with an X-Z plane and an X-Y plane.

The body 11 includes a multi-layer unit 16 and side margins 17.

The multi-layer unit 16 has a configuration in which a plurality of flat plate-like ceramic layers extending along the X-Y plane are laminated in the Z-axis direction.

The multi-layer unit 16 includes a capacitance forming unit 18, covers 19, end margins 20 and 21, a plurality of first internal electrodes 12, and a plurality of second internal electrodes 13.

As shown in FIG. 2, the side margins 17 are formed on both side surfaces S1 and S2 of the multi-layer unit 16, the side surfaces S1 and S2 being oriented in the Y-axis direction.

The capacitance forming unit 18 is provided at the center of the body 11 and is configured as a functional unit that serves the function of storing charge of the multi-layer ceramic capacitor 10.

The end margins 20 and 21 are provided on both sides of the capacitance forming unit 18 in the X-axis direction. In other words, the end margin 20 is disposed between the capacitance forming unit 18 and the first external electrode 14, and the end margin 21 is disposed between the capacitance forming unit 18 and the second external electrode 15.

The covers 19 each have a flat plate-like shape extending along the X-Y plane and cover both the main surfaces of the capacitance forming unit 18 and of the end margins 20 and 21, the main surfaces being oriented in the Z-axis direction. The covers 19 are not provided with the first internal electrodes 12 and the second internal electrodes 13.

The side margins 17 and the covers 19 have main functions of protecting the capacitance forming unit 18 and the end margins 20 and 21 and protecting insulation properties of the periphery of the capacitance forming unit 18 and the end margins 20 and 21.

The first internal electrodes 12 and the second internal electrodes 13 are alternately disposed between the ceramic layers along the Z-axis direction. The first internal electrodes 12 are disposed across the capacitance forming unit 18 and the end margin 20 and connected to the first external electrode 14. The second internal electrodes 13 are disposed across the capacitance forming unit 18 and the end margin 21 and connected to the second external electrode 15.

Therefore, the first internal electrodes 12 and the second internal electrodes 13 intersect with each other and face each other in the capacitance forming unit 18. Further, the first internal electrodes 12 are separated from the second external electrode 15 by the end, margin 21 and thus insulated from the second external electrode 15. Furthermore, the second internal electrodes 13 are separated from the first external electrode 14 by the end margin 20 and thus insulated from the first external electrode 14.

The first internal electrodes 12 and the second internal electrodes 13 are each made of an electrical conductive material and function as internal electrodes of the multi-layer ceramic capacitor 10. Examples of the electrical conductive material include nickel (Ni), copper (Cu), palladium (Pd), platinum (Pt), silver (Ag), gold (Au), and a metal material including an alloy of them. Typically, a metal material mainly containing nickel (Ni) is employed.

The capacitance forming unit 18 and the end margins 20 and 21 are made of ceramics. In the multi-layer ceramic capacitor 10, in order to increase capacitances of the ceramic layers provided between the first internal electrodes 12 and the second internal electrodes 13, a material having a high dielectric constant is used as a material forming the ceramic layers. For the material forming the capacitance forming unit 18 and the end margins 20 and 21, polycrystal of a barium titanate ($BaTiO_3$) based material, i.e., polycrystal having a Perovskite structure containing barium (Ba) and titanium (Ti) can be used, for example.

Alternatively, the material forming the capacitance forming unit 18 and the end margins 20 and 21 may be, in addition to the barium titanate ($BaTiO_3$) based material, polycrystal of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The side margins 17 and the covers 19 are also made of ceramics. The ceramics forming the side margins 17 and the covers 19 desirably includes polycrystal of dielectrics, which has, as a main phase, the same type of composition system as that of the capacitance forming unit 18. This leads to suppression of internal stress in the body 11.

The side margins 17, the capacitance forming unit 18, the covers 19, and the end margins 20 and 21 according to this embodiment may further contain, in addition to barium (Ba) and titanium (Ti), for example, one or more types of metal elements such as magnesium (Mg), manganese (Mn), aluminum (Al), calcium (Ca), vanadium (V), chromium (Cr), zirconium (Zr), molybdenum (Mo), tunasten (W), tantalum (Ta), niobium (Nb), silicon (Si), boron (B), yttrium (Y), europium (Eu), gadolinium (Gd), dysprosium (Dy), holmium (Ho), erbium (Er), ytterbium (Yb), lithium (Li), potassium (K), and sodium (Na).

With the configuration described above, when a voltage is applied between the first external electrode 14 and the second external electrode 15 in the multi-layer ceramic capacitor 10, a voltage is applied to the ceramic layers between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the configuration of the multi-layer ceramic capacitor 10 is not limited to a specific configuration, and a well-known configuration can be applied thereto as appropriate in accordance with the size and performance expected for the multi-layer ceramic capacitor 10. For example, the number of first internal electrodes 12 and the number of second internal electrodes 13 in the capacitance forming unit 18 are not limited to the numbers shown in FIGS. 2 and 3 and can be determined as appropriate.

Figure 4:
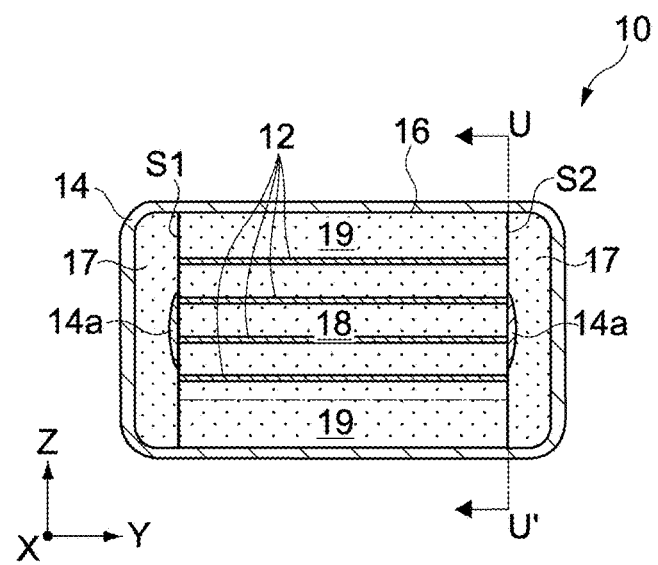
FIG. 4 is a cross-sectional view of the multi-layer ceramic capacitor taken along the R-R' line of FIG. 1.
Figure 5:
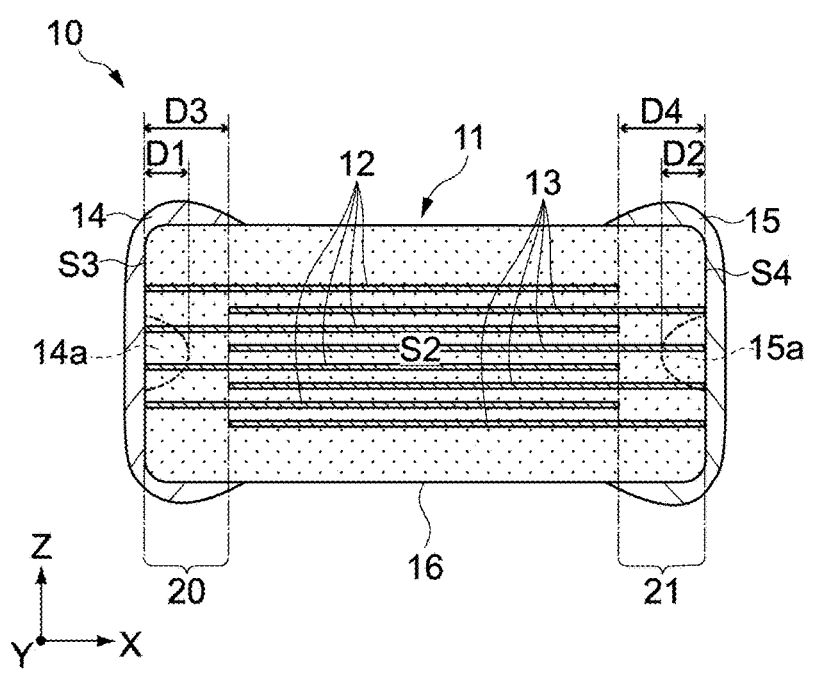
FIG. 5 is a cross-sectional view of the multi-layer ceramic capacitor taken along the U-U' line of FIG. 4.

FIG. 4 is a cross-sectional view of the multi-layer ceramic capacitor 10 taken along the R-R' line of FIG. 1. FIG. 5 is a cross-sectional view of the multi-layer ceramic capacitor 10 taken along the U-U' line of FIG. 4 and is also a view of the side surface S2 of the multi-layer unit 16. It should be noted that FIG. 5 shows only the side surface S2, but the side surface S1 also has a similar configuration.

As shown in FIG. 3, the first external electrode 14 and the second external electrode 15 cover the body 11 from the end surface S3 and the end surfaces S4 of the multi-layer unit 16, respectively. As shown in FIG. 4, the first external electrode 14 according to this embodiment includes an entry portion 14a that enters a gap between each of the side surfaces S1 and S2 of the multi-layer unit 16 and the side margin 17 adjacent thereto. Similarly, the second external electrode 15 includes an entry portion 15a that enters a gap between each of the side surfaces S1 and S2 of the multi-layer unit 16 and the side margin 17 adjacent thereto.

The entry portion 14a is formed integrally with the first external electrode 14. As shown in FIG. 5, the entry portion 14a extends from the end surface S3 in the X-axis direction. The single entry portion 14a is provided at the center of the end margin 20 in the Z-axis direction. With this configuration, the first external electrode 14 is connected to the first internal electrodes 12 not only in the end surface S3 but also in the end margin 20.

The entry portion 15a is formed integrally with the second external electrode 15. As shown in FIG. 5, the entry portion 15a extends from the end surface S4 in the X-axis direction. The single entry portion 15a is provided at the center of the end margin 21 in the Z-axis direction. With this configuration, the second external electrode 15 is connected to the second internal electrodes 13 not only in the end surface S4 but also in the end margin 21.

In such a manner, in the multi-layer ceramic capacitor 10, the first external electrode 14 includes the entry portion 14a, and the second external electrode 15 includes the entry portion 15a. This can ensure a wide area where the first external electrode 14 is connected to the first internal electrodes 12 and the second external electrode 15 is connected to the second internal electrodes 13. It should be noted that FIG. 5 shows the positions of the entry portions 14a and 15a, which are disposed adjacently to the side surface S2, by broken lines.

The entry portions 14a and 15a can be more rigidly connected to the first and second internal electrodes 12 and 13 made of a metal material than those made of ceramics. Thus, in the multi-layer ceramic capacitor 10, high connection strength of the first and second external electrodes 14 and 15 to the body 11 is obtained. Therefore, in the multi-layer ceramic capacitor 10, the first and second external electrodes 14 and 15 can be prevented from being peeled off from the body 11, and high reliability is thus obtained.

FIG. 5 shows a dimension D1 of the entry portion 14a from the end surface S3, a dimension D2 of the entry portion 15a from the end surface S4, a dimension D3 of the end margin 20 in the X-axis direction, and a dimension D4 of the end margin 21 in the X-axis direction.

The dimension D1 of the entry portions 14a is smaller than the dimension D3 of the end margin 20. This can prevent the first external electrode 14 from being short-circuited to the second internal electrodes 13. Similarly, the dimension D2 of the entry portion 15a is smaller than the dimension D4 of the end margin 21. This can prevent the second external electrode 15 from being short-circuited to the first internal electrodes 12.

As the dimensions D1 and D2 of the entry portions 14a and 15a are larger, larger areas where the first and second external electrodes 14 and 15 are connected to the body 11 can be ensured. More specifically, as the dimensions D1 and D2 of the entry portions 14a and 15a are larger, the connection strength between the body 11 and the first and second external electrodes 14 and 15 is increased. As a result, in view of increase in connection strength between the body 11 and the first and second external electrodes 14 and 15, the dimensions D1 and D2 of the entry portions 14a and 15a are desirably large.

Meanwhile, as the dimension D1 of the entry portion 14a is larger, the entry portion 14a is closer to the second internal electrodes 13. Further, as the dimension D2 of the entry portion 15a is larger, the entry portion 15a is closer to the first internal electrodes 12.

As a result, as the dimension D1 of the entry portions 14a is larger, the entry portion 14a (first external electrode 14) is easier to be electrically continuous with the second internal electrodes 13 via moisture included in the air flowing in a gap E1 between the multi-layer unit 16 and the side margin 17, in which the entry portion 14a is formed.

Similarly, as the dimension D2 of the entry portion 15a is larger, the entry portion 15a (second external electrode 15) is easier to be electrically continuous with the first internal electrodes 12 via moisture included in the air flowing in a gap E2 between the multi-layer unit 16 and the side margin 17, in which the entry portion 15a is formed.

In other words, defectives in terms of moisture resistance are easy to occur in the multi-layer ceramic capacitor 10.

Therefore, in the body 11, the dimension D1 of the entry portion 14a is desirably kept to 30% or less of the dimension D3 of the end margin 20, and the dimension D2 of the entry portion 15a is desirably kept to 30% or less of the dimension D4 of the end margin 21.

With this configuration, in the multi-layer ceramic capacitor 10, defectives in terms of moisture resistance can be suppressed while increasing the connection strength between the first and second external electrodes 14 and 15 and the body 11. Therefore, the reliability of the multi-layer ceramic capacitor 10 is more increased.

Figure 6:
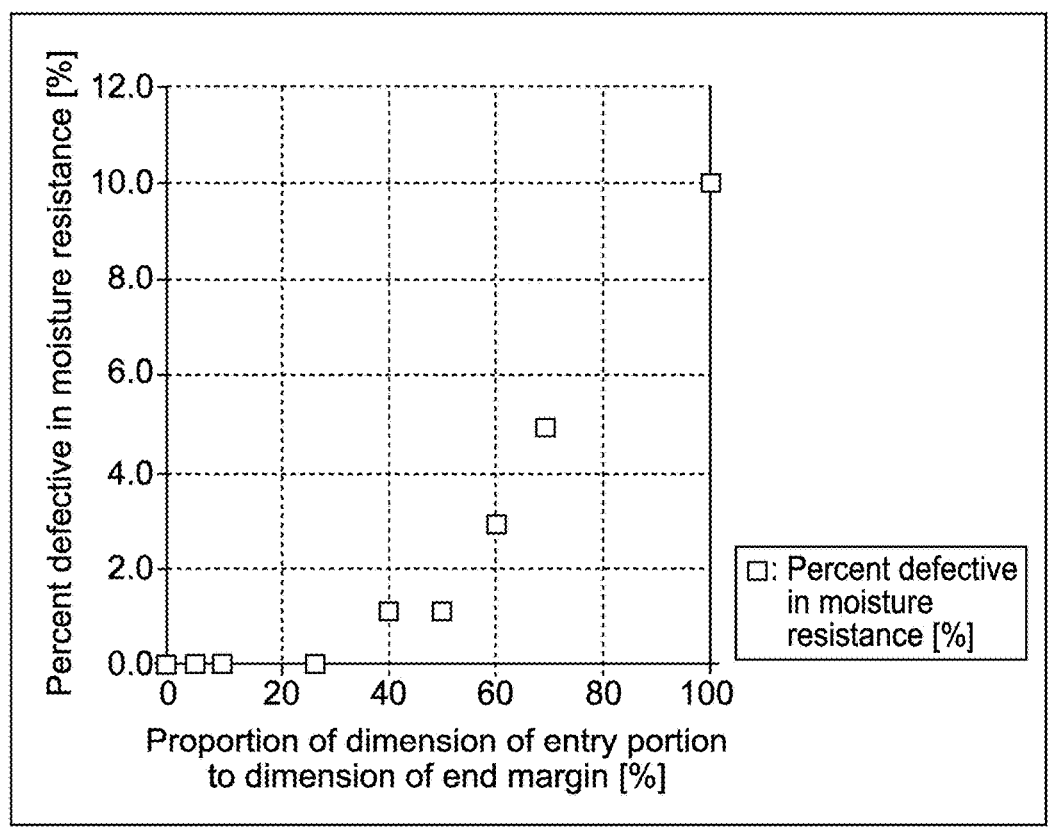
FIG. 6 is a graph of compiled evaluation results of moisture resistance of the multi-layer ceramic capacitor.

FIG. 6 is a graph of compiled evaluation results of the moisture resistance of the multi-layer ceramic capacitor 10. The moisture resistance of the multi-layer ceramic capacitor 10 was evaluated by testing hygroscopicity of the multi-layer ceramic capacitor 10.

Specifically, a hygroscopicity test was performed, in which several hundreds of samples whose entry portions 14a and 15a have different dimensions D1 and D2 are held at a temperature of 45° C. and a humidity of 95% under application of a rated voltage of 10 V. For each of the samples subjected to the hygroscopicity test, an electric resistance value was measured, and samples whose electric resistance value is less than 10 MΩ were determined as defectives in terms of moisture resistance.

Here, "dimension of entry portion" shown in FIG. 6 refers to a dimension of an entry portion that has the largest dimension D1 or D2 in the X-axis direction out of the entry portions 14a and 15a, and "dimension of end margin" refers to a dimension of the end margin 20 or 21 in the X-axis direction, in which the above-mentioned entry portion is disposed. Further, "percent defective in moisture resistance" refers to a proportion of samples having defectives in terms of moisture resistance, out of the several hundreds of samples having different proportions of "the dimension of the entry portion" to "the dimension of the end margin".

With reference to FIG. 6, it can be observed that if the dimensions D1 and D2 of the entry portions 14a and 15a are smaller than the dimensions D3 and D4 of the end margins 20 and 21, the percent defective in moisture resistance is suppressed to 10% or less. It is experimentally determined by the inventors of the present application that if the dimensions D1 and D2 of the entry portions 14a and 15a are 30% or less of the dimensions D3 and D4 of the end margins 20 and 21, the defectives in terms of moisture resistance can be most probably suppressed.

2. METHOD OF PRODUCING MULTI-LAYER CERAMIC CAPACITOR 10

Figure 7:
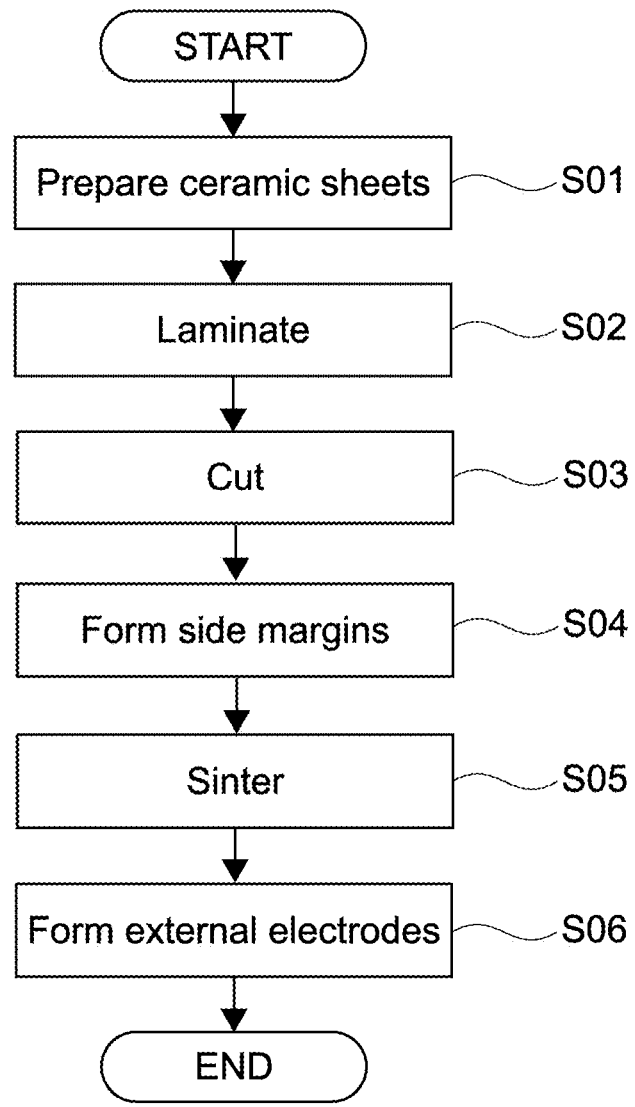
FIG. 7 is a flowchart showing a method of producing the multi-layer ceramic capacitor.
Figure 8:
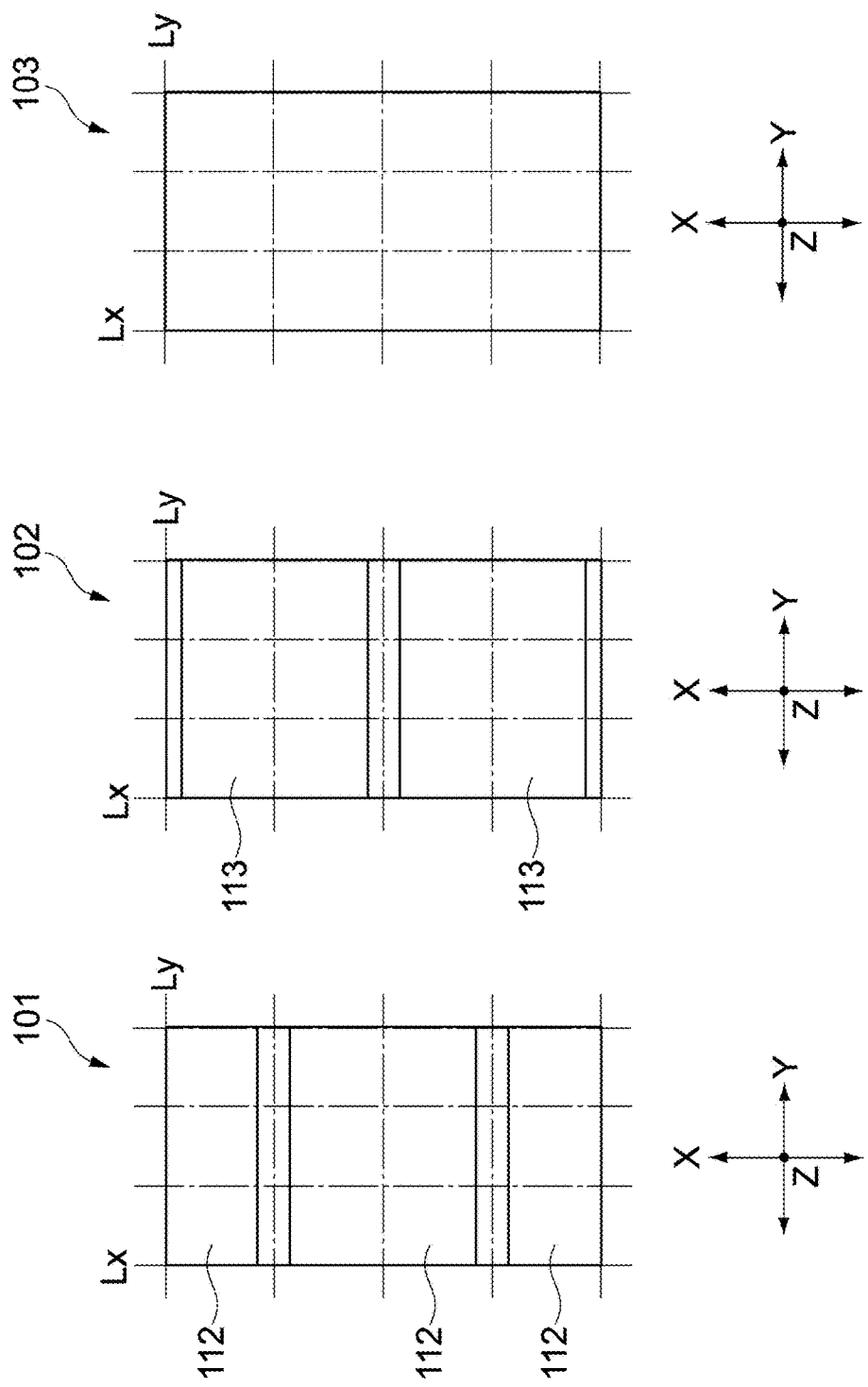
FIG. 8A is a plan view showing a production process of the multi-layer ceramic capacitor.
FIG. 8B is a plan view showing the production process of the multi-layer ceramic capacitor.
FIG. 8C is a plan view showing the production process of the multi-layer ceramic capacitor.

FIG. 7 is a flowchart showing a method of producing the multi-layer ceramic capacitor 10. FIGS. 8A to 16 are views each showing a production process of the multi-layer ceramic capacitor 10. Hereinafter, the method of producing the multi-layer ceramic capacitor 10 will be described along FIG. 7 with reference to FIGS. 8A to 16 as appropriate.

2.1 STEP S01: PREPARATION OF CERAMIC SHEETS

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are mainly made of insulating ceramics and are configured as unsintered dielectric green sheets. The first, second, and third ceramic sheets 101, 102, and 103 are formed into sheets by using a roll coater or a doctor blade, for example.

FIGS. 8A, 8B, and 8C are plan views of the first, second, and third ceramic sheets 101, 102, and 103, respectively. At this stage, the first, second, and third ceramic sheets 101, 102, and 103 are not yet cut into the multi-layer ceramic capacitors 10. FIGS. 8A, 8B, and 8C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 8A, 8B, and 8C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first and second internal electrodes 112 and 113 can be formed using an electrical conductive paste containing nickel (Ni), for example. For formation of the first and second internal electrodes 112 and 113 by use of an electrical conductive paste, a screen printing method or a gravure printing method can be used, for example.

Each of the first and second internal electrodes 112 and 113 is disposed over two areas and extends like a belt in the Y-axis direction. The two areas are adjacent to each other in the X-axis direction and divided by the cutting line Ly. The first internal electrodes 112 are shifted from the second internal electrodes 113 in the X-axis direction by one row including the areas divided by the cutting lines Ly. In other words, the cutting line Ly passing through the center of the first internal electrode 112 passes through an area between the second internal electrodes 113, and the cutting line Ly passing through the center of the second internal electrode 113 passes through an area between the first internal electrodes 112.

2.2 STEP S02: LAMINATION

In Step S02, the first, second, and third ceramic sheets 101, 102, and 103 prepared in Step S01 are laminated, to produce a multi-layer sheet 104.

Figure 9:
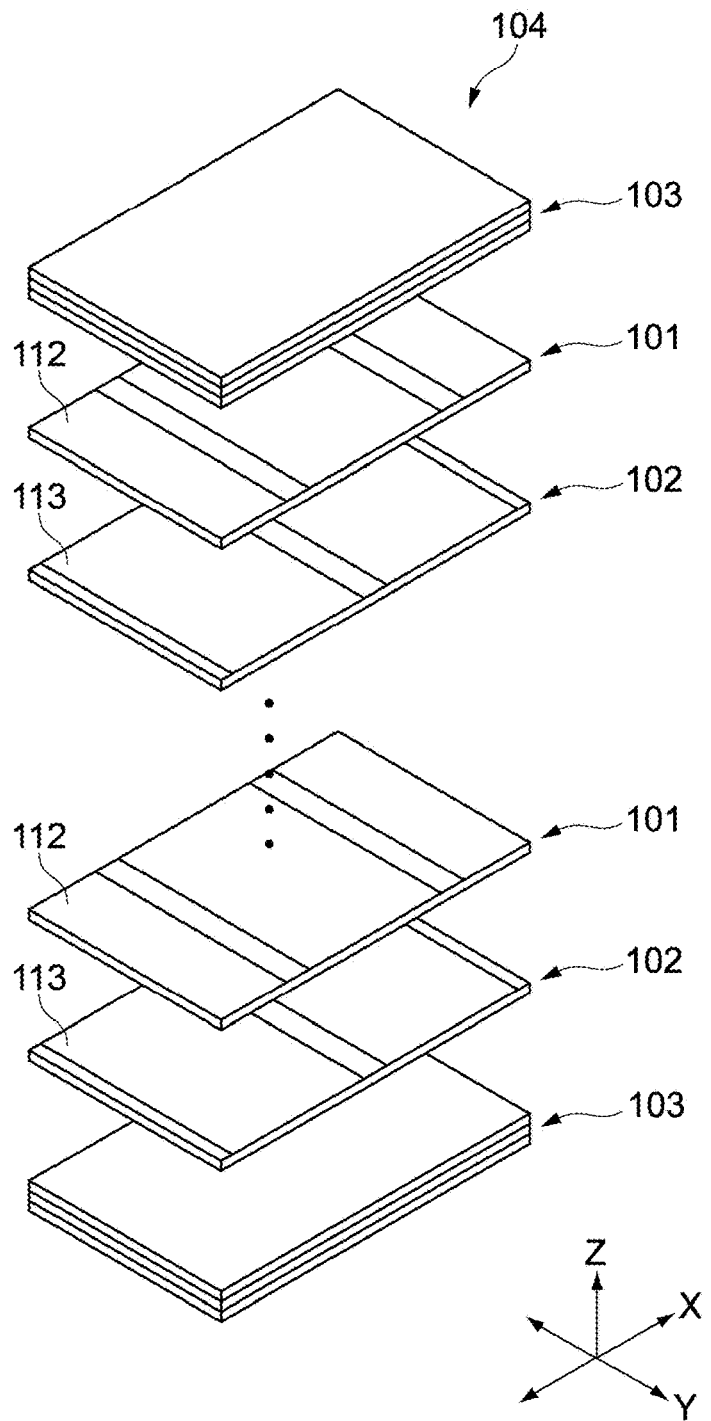
FIG. 9 is an exploded perspective view showing the production process of the multi-layer ceramic capacitor.

FIG. 9 is an exploded perspective view of the multi-layer sheet 104 obtained in Step S02. For the purpose of description, FIG. 9 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the uppermost and lowermost surfaces of the first and second ceramic sheets 101 and 102 alternately laminated in the Z-axis direction. It should be noted that in the example shown in FIG. 9, three third ceramic sheets 103 are laminated on each of the uppermost and lowermost surfaces of the laminated first and second ceramic sheets 101 and 102, but the number of third ceramic sheets 103 can be changed as appropriate.

2.3 STEP S03: CUTTING

In Step S03, the multi-layer sheet 104 obtained in Step S02 is cut with a rotary blade, a push-cutting blade, or the like, to produce unsintered multi-layer chips 116.

Figure 10:
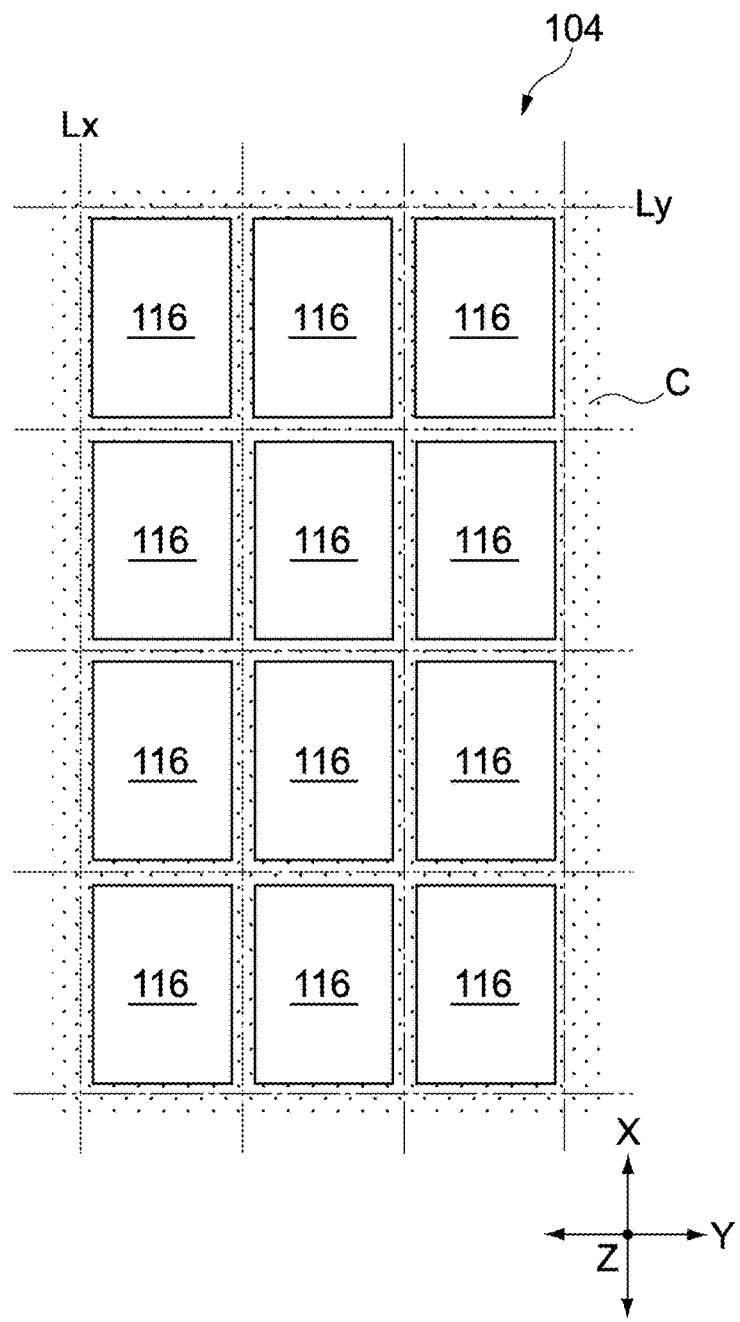
FIG. 10 is a plan view showing the production process of the multi-layer ceramic capacitor.

FIG. 10 is a plan view of the multi-layer sheet 104 after Step S03. The multi-layer sheet 104 is cut along the cutting lines Lx and Ly while being fixed to a holding member C. With this configuration, the multi-layer sheet 104 is singulated, so that the multi-layer chips 116 are obtained. At that time, the holding member C is not cut, and thus the multi-layer chips 116 are connected via the holding member C.

Figure 11:
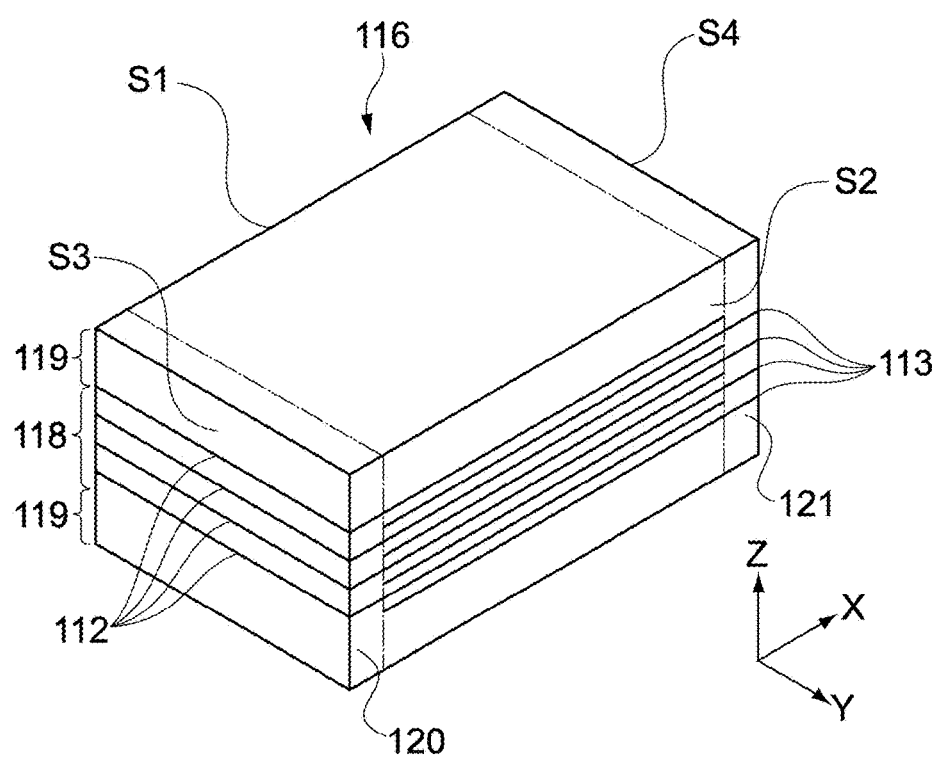
FIG. 11 is a perspective view showing the production process of the multi-layer ceramic capacitor.

FIG. 11 is a perspective view of the multi-layer chip 116 obtained in Step S03. The multi-layer chip 116 includes a capacitance forming unit 118, covers 119, and end margins 120 and 121, which are unsintered. In the multi-layer chip 116, the unsintered first and second internal electrodes 112 and 113 are exposed to the cut surfaces, i.e., both the side surfaces S1 and S2 oriented in the Y-axis direction.

2.4 STEP S04: FORMATION OF SIDE MARGINS

In Step S04, unsintered side margins 117 are provided to the side surfaces S1 and S2 of the multi-layer chip 116, to produce an unsintered body 111.

In Step S04, in order to provide the side margins 117 to both the side surfaces S1 and S2 of the multi-layer chip 116, the orientation of the multi-layer chip 116 is changed as appropriate by replacement of a holding member such as a tape, for example.

In particular, in Step S04, the side margins 117 are provided to both the side surfaces S1 and S2 that are oriented in the Y-axis direction, both the side surfaces S1 and S2 being the cut surfaces of the multi-layer chip 116 in Step S03. For that reason, in Step S04, it is desirable to previously detach the multi-layer chips 116 from the holding member C and rotate the multi-layer chips 116 by 90 degrees.

Figure 12:
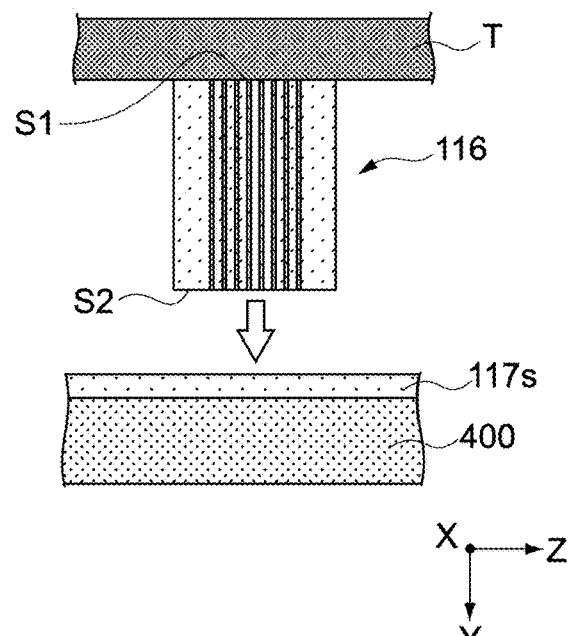
FIG. 12 is a schematic view showing the production process of the multi-layer ceramic capacitor.
Figure 13:
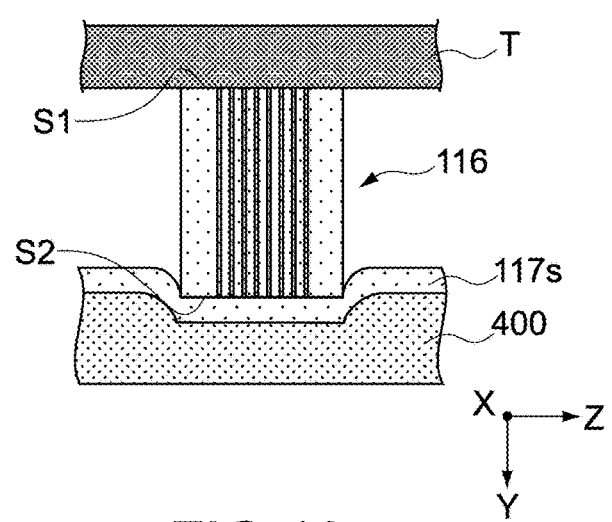
FIG. 13 is a schematic view showing the production process of the multi-layer ceramic capacitor.
Figure 14:
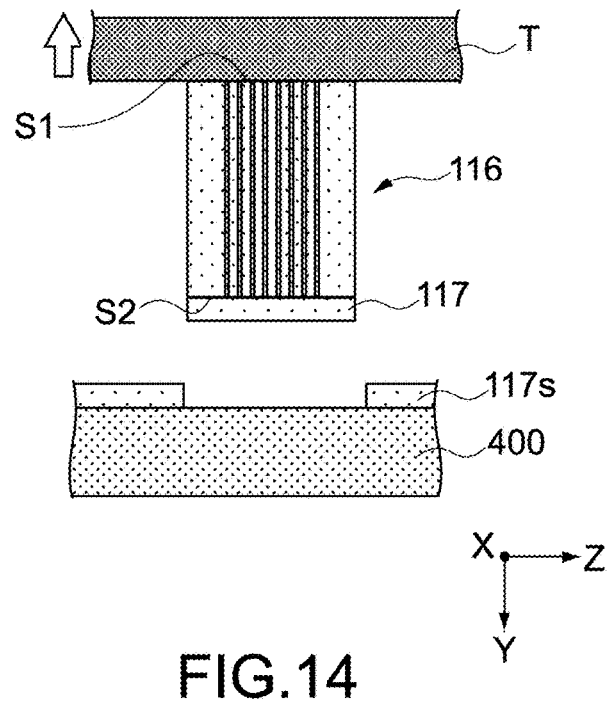
FIG. 14 is a schematic view showing the production process of the multi-layer ceramic capacitor.

FIGS. 12 to 14 are schematic views showing the process of Step S04 and showing a state where a side margin sheet 117s is punched out by the multi-layer chip 116. Hereinafter, the process of Step S04 will be described step by step.

First, the side margin sheet 117s for forming the side margins 117 is prepared. The side margin sheet 117s is configured as an unsintered dielectric green sheet mainly made of insulating ceramics, similar to the first, second, and third ceramic sheets 101, 102, and 103 prepared in Step S01.

The side margin sheet 117s is formed into a sheet by using a roll coater or a doctor blade, for example.

Next, as shown in FIG. 12, the side margin sheet 117s is disposed on a flat plate-like elastic body 400. The multi-layer chip 116 is then disposed such that the side surface S2 of the multi-layer chip 116 faces the side margin sheet 117s in the Y-axis direction. In Step S04, the orientation of the multi-layer chip 116 is appropriately changed by the step of replacing the holding member such as a tape, and the side surface S1 of the multi-layer chip 116 is thus held by a tape T, as shown in FIG. 12.

Subsequently, the multi-layer chip 116 is moved in the Y-axis direction toward the side margin sheet 117s, and the side surface S2 of the multi-layer chip 116 is thus pressed against the side margin sheet 117s.

In this case, as shown in FIG. 13, the multi-layer chip 116 bites into the elastic body 400 together with the side margin sheet 117s. Accordingly, the elastic body 400 is raised in the Y-axis direction and pushes up the side margin sheet 117s by a pressing force in the Y-axis direction that is applied from the multi-layer chip 116 to the elastic body 400.

This causes a shear force applied from the elastic body 400 to the side margin sheet 117s, and the side margin sheet 117s facing the side surface S2 in the Y-axis direction is cut off. This side margin sheet 117s is then attached to the side surface S2.

Next, when the multi-layer chip 116 is moved in the Y-axis direction so as to be separated from the elastic body 400, as shown in FIG. 14, only the side margin sheet 117s attached to the side surface S2 is separated from the elastic body 400. Thus, the side margin 117 is formed on the side surface S2 of the multi-layer chip 116.

Subsequently, the multi-layer chip 116 held by the tape T is held by another tape. Thus, the side surface S1 of the multi-layer chip 116 is exposed to face the side margin sheet 117s in the Y-axis direction. Through a step similar to the above-mentioned step of forming the side margin 117 on the side surface S2, the side margin 117 is formed also on the side surface S1.

This provides an unsintered body 111 including the side margins 117 formed on both the side surfaces S1 and S2 of the multi-layer chip 116.

In Step S04, along with formation of the side margins 117 on the side surfaces S1 and S2 of the multi-layer chip 116, the above-mentioned gaps E1 and E2 respectively corresponding to the entry portions 14a and 15a are formed between each of the side surfaces S1 and S2 and the side margin 117 adjacent thereto.

Figure 15:
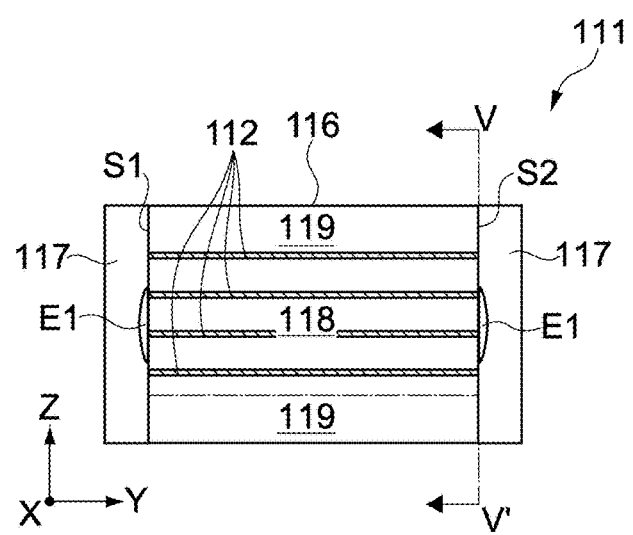
FIG. 15 is a plan view showing the production process of the multi-layer ceramic capacitor.
Figure 16:
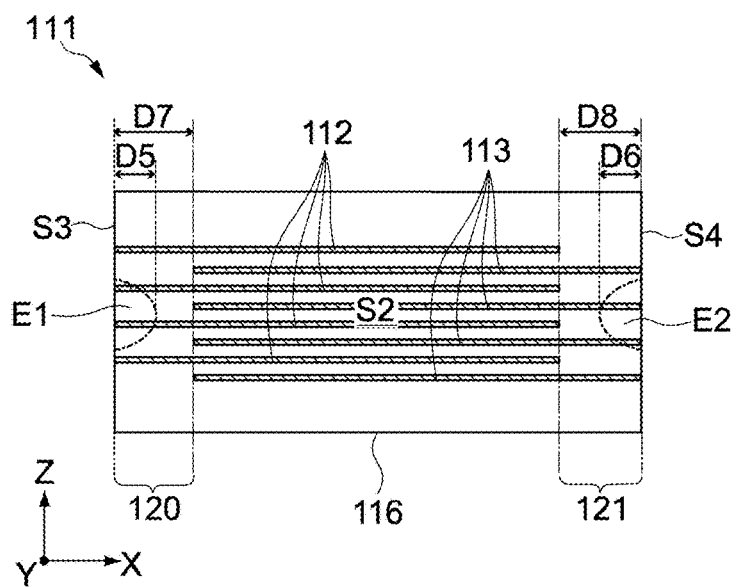
FIG. 16 is a cross-sectional view of the multi-layer ceramic capacitor taken along the V-V' line of FIG. 15.

FIGS. 15 and 16 are views of the unsintered body 111 obtained in Step S04. FIG. 15 is a plan view of the unsintered body 111. FIG. 16 is a cross-sectional view of the unsintered body 111 taken along the V-V' line of FIG. 15 and is also a view of the side surface S2 of the multi-layer chip 116. It should be noted that FIG. 16 shows only the side surface S2, but the side surface S1 also has a similar configuration.

As shown in FIG. 16, the gap E1 corresponding to the entry portion 14a extends from the end surface S3 in the X-axis direction. The single gap E1 is provided at the center of the end margin 120 in the Z-axis direction. Similarly, the gap E2 corresponding to the entry portion 15a extends from the end surface S4 in the X-axis direction. The single gap E2 is provided at the center of the end margin 121 in the Z-axis direction.

FIG. 16 shows a dimension D5 of the gap E1 from the end surface S3, a dimension D6 of the gap E2 from the end surface S4, a dimension D7 of the end margin 120 in the X-axis direction, and a dimension D8 of the end margin 121 in the X-axis direction. It should be noted that FIG. 16 shows the positions of the gaps E1 and E2, which are disposed adjacently to the side surface S2, by broken lines.

The dimension D5 of the gap E1 is smaller than the dimension D7 of the end margin 120. Similarly, the dimension D6 of the gap E2 is smaller than the dimension D8 of the end margin 121.

In this embodiment, the dimension D5 of the gap E1 is desirably 30% or less of the dimension D7 of the end margin 120, and the dimension D6 of the gap E2 is desirably 30% or less of the dimension D8 of the end margin 121.

The number, form, and arrangement of the gaps E1 and E2 are not particularly limited and can be determined as appropriate in accordance with the configurations of the entry portions 14a and 15a, which are formed by filling the gaps E1 and E2 with an electrode material in Step S06 to be described later.

Further, in Step S04, the gaps E1 and E2 are formed by, for example, adjusting conditions for punching out when the side surfaces S1 and S2 of the multi-layer chip 116 punch out the side margin sheet 117s.

Specifically, the gaps E1 and E2 can be formed by adjusting a pressing force or a pressing speed at which the multi-layer chip 116 punches out the side margin sheet 117s, an elastic modulus of the elastic body 400, physical properties of the side margin sheet 117s, or the like.

2.5 STEP S05: SINTERING

In Step S05, the unsintered body 111 obtained in Step S04 is sintered to produce the body 11 of the multi-layer ceramic capacitor 10 shown in FIGS. 1 to 3. In other words, in Step S05, the first internal electrodes 112 and the second internal electrodes 113 respectively become the first internal electrodes 12 and the second internal electrodes 13, and the multi-layer chip 116 becomes the multi-layer unit 16. Further, the side margins 117 become the side margins 17, and the end margins 120 and 121 respectively become the end margins 20 and 21.

A sintering temperature for the body 111 in Step S05 can be determined on the basis of a sintering temperature for the multi-layer chip 116 and the side margins 117. For example, when a barium titanate ($BaTiO_3$) based material is used as ceramics, the sintering temperature for the body 111 can be set to approximately 1,000 to 1,300° C. Further, sintering can be performed in a reduction atmosphere or a low-oxygen partial pressure atmosphere, for example.

In this embodiment, the gaps E1 and E2 can be formed between each of the side surfaces S1 and S2 and the side margin 17 adjacent thereto also by adjusting conditions for sintering when the unsintered body 111 is sintered.

Specifically, for example, the composition of ceramics of the multi-layer chip 116 and the composition of ceramics of the side margins 117 are made different from each other to cause a difference in shrinkage behavior between the multi-layer chip 116 and the side margins 117 at the time of sintering. With this configuration, in the body 11 after subjected to the sintering, the gaps E1 and E2 can be formed between each of the side surfaces S1 and S2 and the side margin 17 adjacent thereto.

It should be noted that when the gaps E1 and E2 are formed between each of the side surfaces S1 and S2 and the side margin 17 adjacent thereto by adjusting conditions for sintering when the unsintered body 111 is sintered, the gaps E1 and E2 do not need to be formed in Step S04 described above.

2.6 STEP S06: FORMATION OF EXTERNAL ELECTRODES

In Step S06, the first external electrode 14 and the second external electrode 15 are formed on the body 11 obtained in Step S05, to produce the multi-layer ceramic capacitor 10 shown in FIGS. 1 to 3.

In Step S06, first, an unsintered electrode material is applied so as to cover one of the end surfaces of the body 11 and then applied so as to cover the other one of the end surfaces of the body 11, the end surfaces being oriented in the X-axis direction. With this configuration, the gaps E1 and E2 are filled with the unsintered electrode material.

In Step S06, the whole or part of the gaps E1 and E2 may be filled with the unsintered electrode material. However, in view of increase in connection strength between the first and second external electrodes 14 and 15 and the body 11, the whole of the gaps E1 and E2 are desirably filled with the unsintered electrode material.

A method of applying the unsintered electrode material only needs to be a method capable of filling the gaps E1 and E2 with the unsintered electrode material and is not limited to a specific method. Examples of the method of applying the unsintered electrode material include a dip method.

Next, the unsintered electrode materials applied to the body 11 are subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 respectively including the entry portions 14a and the entry portions 15a are completed.

It should be noted that part of the processing in Step S06 described above may be performed before Step S05. For example, before Step S05, the unsintered electrode material may be applied to both the end surfaces of the unsintered body 111 that are oriented in the X-axis direction, and in Step S05, the unsintered body 111 may be sintered and, simultaneously, the unsintered electrode material may be baked to form base films of the first external electrode 14 and the second external electrode 15.

2.7 MODIFIED EXAMPLE

A method of producing the multi-layer ceramic capacitor 10 is not limited to the production method described above, and the production steps may be changed or added as appropriate.

A method of forming the side margins 117 on both the side surfaces S1 and S2 of the multi-layer chip 116 is not limited to the above method of punching out the side margin sheet 117s.

For example, the side margin sheets 117s previously cut may be attached to both the side surfaces S1 and S2 of the multi-layer chip 116, to form the side margins 117.

Figure 17:
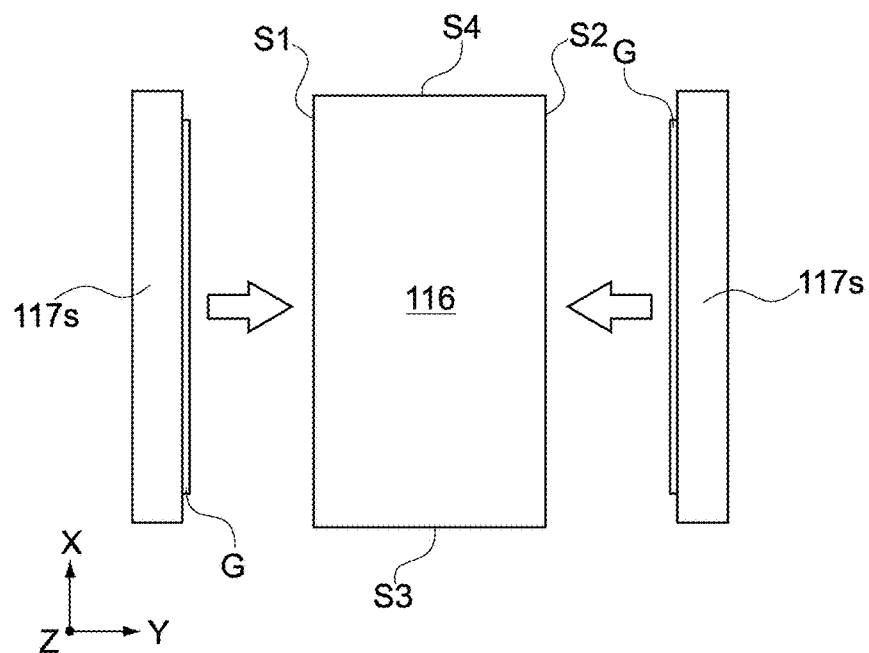
FIG. 17 is a plan view showing a production process of a multi-layer ceramic capacitor according to a modified example of the present invention.
Figure 18:
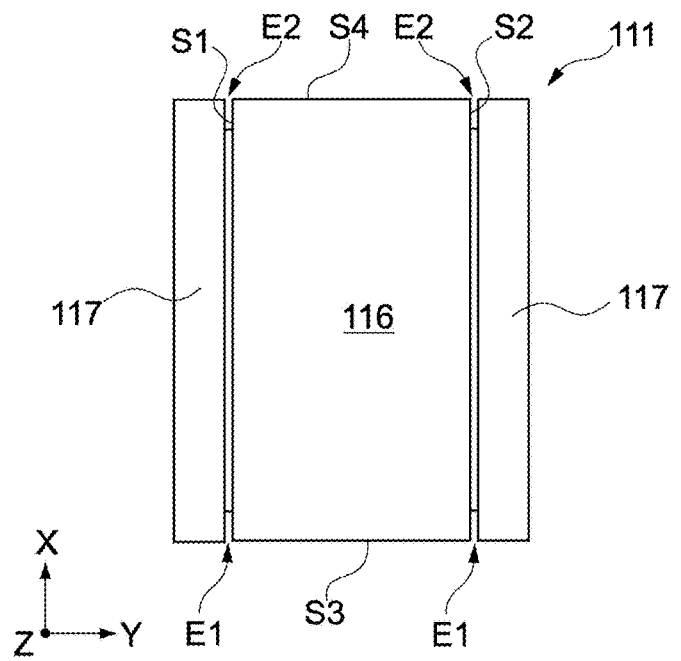
FIG. 18 is a plan view showing the production process of the multi-layer ceramic capacitor.

If the previously-cut side margin sheets 117s are attached to the side surfaces S1 and S2 of the multi-layer chip 116 to form the side margins 117, for example, the gaps E1 and E2 can be formed by the following method. FIGS. 17 and 18 are plan views each showing a production process of a multi-layer ceramic capacitor 10 according to a modified example of the present invention.

First, as shown in FIG. 17, an adhesive member G such as an adhesive is applied to the center of each of the previously-cut side margin sheets 117s in the X-axis direction. Subsequently, those side margin sheets 117s are attached to the side surfaces S1 and S2 such that the adhesive member G is disposed at the center of each of the side surfaces S1 and S2 in the X-axis direction.

With this configuration, as shown in FIG. 18, gaps are generated between the ends of each side margin 117 in the X-axis direction, at which the adhesive member G is not disposed, and each of the side surfaces S1 and S2. Thus, the gaps E1 and E2 are formed between each of the side surfaces S1 and S2 and the side margin 117 adjacent thereto.

In the method described above, the gaps E1 and E2 are formed along with the formation of the side margins 117 on the side surfaces S1 and S2, but the present invention is not limited thereto. For example, after the body 111 is obtained, the gaps E1 and E2 can be formed also by peeling off the side margins 117 from the side surfaces S1 and S2 posteriori.

In this case, by a dip method of immersing both the side surfaces S1 and S2 of the multi-layer chip 116 into a paste material made of ceramics and pulling the side surfaces S1 and S2 out of the paste material, the side margins 117 may be formed on both the side surfaces S1 and S2 of the multi-layer chip 116.

Figure 19:
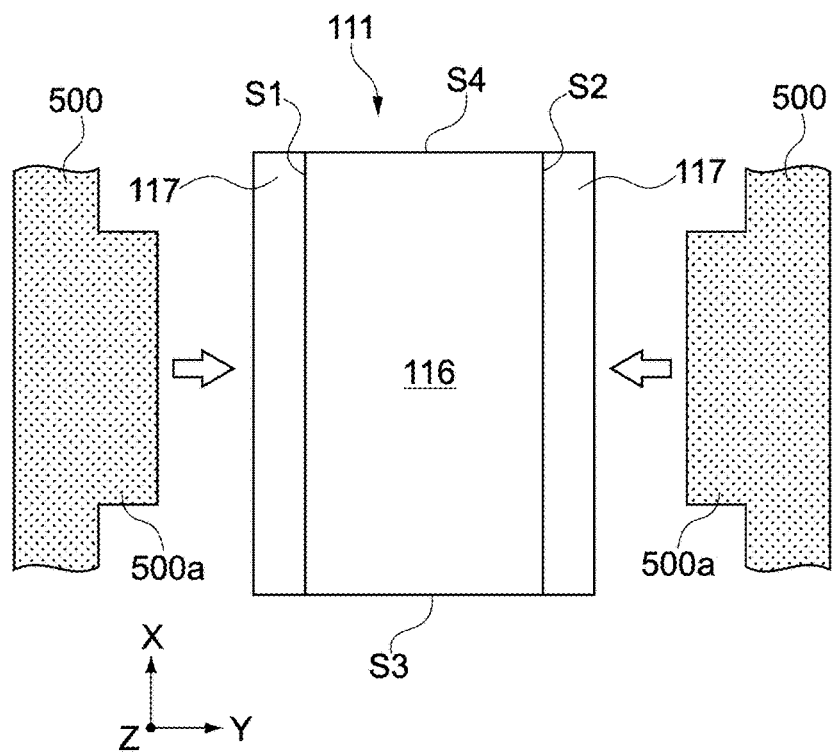
FIG. 19 is a plan view showing the production process of the multi-layer ceramic capacitor.
Figure 20:
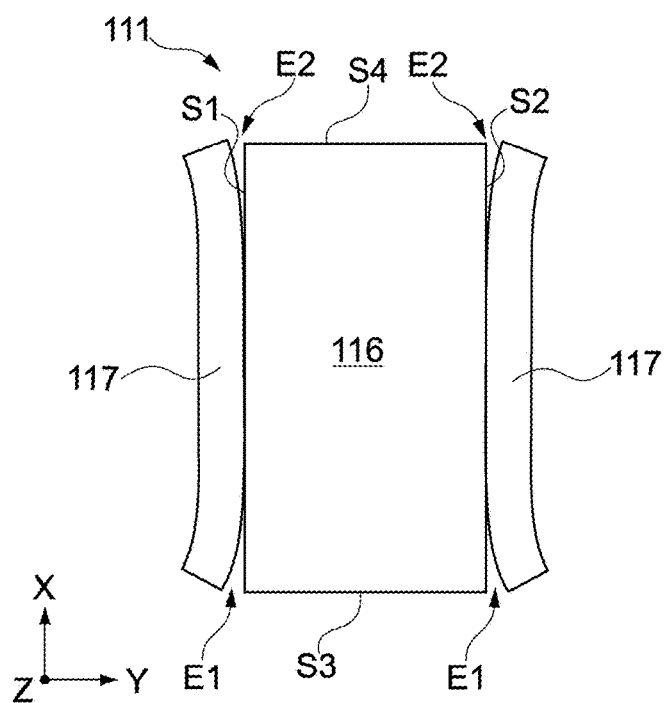
FIG. 20 is a plan view showing the production process of the multi-layer ceramic capacitor.

Forming the gaps E1 and E2 by peeling off the side margins 117 from the side surfaces S1 and S2 posteriori is feasible by the following method, for example. FIGS. 19 and 20 are plan views each showing another production process of a multi-layer ceramic capacitor 10 according to a modified example of the present invention.

Specifically, as shown in FIG. 19, the center of each of the side margins 117 of the body 111 in the X-axis direction is pressed with use of a pressing member 500. Here, a dimension in the X-axis direction of a convex portion 500a that presses the side margin 117 is smaller than a dimension in the X-axis direction of the side margin 117.

With this configuration, the center of the side margin 117 in the X-axis direction receives a pressing force from the convex portion 500a, and both the ends of the side margin 117 in the X-axis direction are pushed up. Thus, as shown in FIG. 20, the gaps E1 and E2 are formed between the side margins 117 and the side surfaces S1 and S2.

3. OTHER EMBODIMENTS

While the embodiment of the present invention has been described, the present invention is not limited to the embodiment described above, and it should be appreciated that the present invention may be variously modified.

Figure 21:
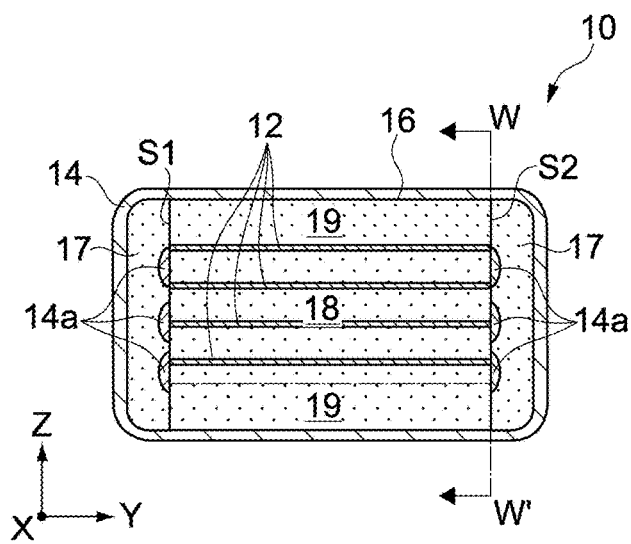
FIG. 21 is a cross-sectional view of a multi-layer ceramic capacitor according to another embodiment of the present invention.
Figure 22:
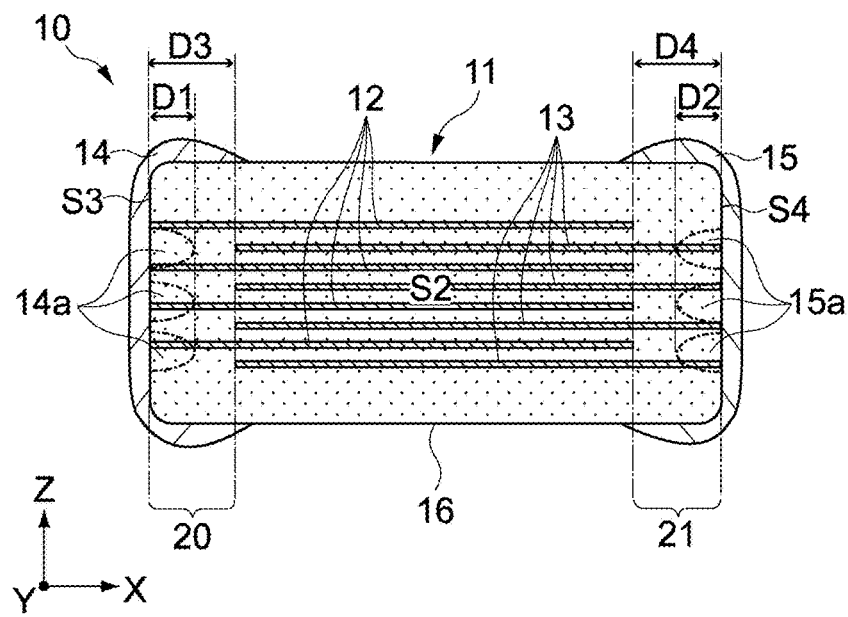
FIG. 22 is a cross-sectional view of the multi-layer ceramic capacitor taken along the W-W' line of FIG. 21.

For example, the single entry portion 14a and the single entry portion 15a, which are disposed on each of the side surfaces S1 and S2 of the multi-layer unit 16 in the embodiment described above, may be a plurality of entry portions 14a and a plurality of entry portions 15a. FIGS. 21 and 22 are cross-sectional views of a multi-layer ceramic capacitor 10 including a plurality of entry portions 14a and a plurality of entry portions 15a on each of the side surfaces S1 and S2. FIG. 22 is a cross-sectional view of the multi-layer ceramic capacitor 10 taken along the W-W' line of FIG. 21. In the configurations shown in FIGS. 21 and 22, three entry portions 14a and three entry portions 15a are disposed on each of the side surfaces S1 and S2 separately from one another in the Z-axis direction.

As shown in FIGS. 21 and 22, the plurality of entry portions 14a and the plurality of entry portions 15a are disposed on each of the side surfaces S1 and S2, and thus connection strength between the body 11 and the first and second external electrodes 14 and 15 is more increased.

It should be noted that the number of entry portions 14a and 15a on each of the side surfaces S1 and S2 may not be three and may be two, or four or more. Further, for the purpose of description, FIGS. 21 and 22 equally show the dimensions D1 of the entry portions 14a and the dimensions D2 of the entry portions 15a. However, the dimensions D1 and D2 may differ in each of the entry portions 14a and 15a. Furthermore, the positions of the entry portions 14a and 15a in each of the side surfaces S1 and S2 can be optionally changed.

Figure 23:
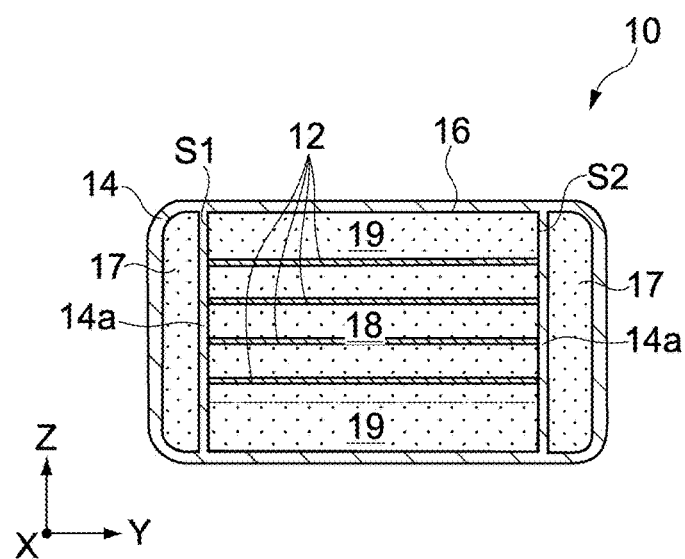
FIG. 23 is a cross-sectional view of the multi-layer ceramic capacitor.

Further, the configurations of the entry portions 14a and 15a are not limited to those partially provided in the Z-axis direction as in the embodiment descried above. The entry portions 14a and 15a may be provided over the entire width in the Z-axis direction. FIG. 23 is a cross-sectional view of a multi-layer ceramic capacitor 10 including entry portions 14a and 15a that are provided over the entire width in the Z-axis direction.

As shown in FIG. 23, the entry portions 14a and 15a are provided over the entire width in the Z-axis direction, and thus connection strength between the body 11 and the first and second external electrodes 14 and 15 is more increased.

Moreover, the entry portions 14a and 15a may be disposed on only one of the side surfaces S1 and S2 of the multi-layer unit 16. Further, only one of the entry portions 14a and 15a may be provided. Furthermore, the number and arrangement of the entry portion 14a and those of the entry portion 15a, which are disposed on each of the side surfaces S1 and S2, may be different from each other. Additionally, the form of the entry portion 14a and that of the entry portion 15a may be different from each other.

What is claimed is:
1. A multi-layer ceramic capacitor, comprising:
   a body including
      a multi-layer unit including
         ceramic layers laminated in a first direction,
         a first internal electrode and a second internal electrode that are alternately disposed between the ceramic layers,
         an end surface that is oriented in a second direction orthogonal to the first direction, the first internal electrode being drawn from the end surface,
         an end margin that is disposed between the end surface and the second internal electrode, and
         a side surface that is oriented in a third direction orthogonal to the first direction and the second direction, the first internal electrode and the second internal electrode being exposed to the side surface, and
      a side margin that covers the side surface of the multi-layer unit; and
   an external electrode that includes an entry portion and covers the body from a side of the end surface,
   the entry portion being disposed on the end margin,
   the entry portion entering a gap, between the side surface and the side margin, from the end surface,
   the entry portion projecting outward from the side surface towards the side margin,
   the entry portion being in direct physical contact with the side surface, and
   the side surface being absent in the side margin.

2. The multi-layer ceramic capacitor according to claim 1, wherein
a dimension of the entry portion in the second direction is 30% or less of a dimension of the end margin in the second direction.

3. The multi-layer ceramic capacitor according to claim 1, wherein
the entry portion is provided over an entire width of the end margin in the first direction between the side margin and the side surface.

4. The multi-layer ceramic capacitor according to claim 2, wherein
the entry portion is provided over an entire width of the end margin in the first direction between the side margin and the side surface.

5. The multi-layer ceramic capacitor according to claim 1, wherein
the entry portion is provided in plurality and the entry portions are provided separately from one another in the first direction between the side margin and the side surface.

6. The multi-layer ceramic capacitor according to claim 2, wherein
the entry portion is provided in plurality and the entry portions are provided separately from one another in the first direction between the side margin and the side surface.

* * * * *